(12) United States Patent
You (10) Patent No.: US 9,346,433 B2
(45) Date of Patent: May 24, 2016

(54) BUCKLE APPARATUS FOR SEAT BELT (71) Applicant: Autoliv Development AB, Vargarda (SE)

(72) Inventor: Byoung Gae You, Wonju-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/417,657

(22) PCT Filed: Sep. 26, 2013

(86) PCT No.: PCT/KR2013/008619
§ 371 (c)(1),
(2) Date: Jan. 27, 2015

(87) PCT Pub. No.: WO2014/025243
PCT Pub. Date: Feb. 13, 2014

(65) Prior Publication Data
US 2015/0166005 A1   Jun. 18, 2015

(30) Foreign Application Priority Data

Aug. 10, 2012   (KR) ........................ 10-2012-0087827

(51) Int. Cl.
*A44B 11/25*       (2006.01)
*B60R 22/00*      (2006.01)

(52) U.S. Cl.
CPC ............. *B60R 22/00* (2013.01); *A44B 11/2523* (2013.01); *A44B 11/2592* (2013.01); *Y10T 24/4567* (2015.01)

(58) Field of Classification Search
CPC ........... A44B 11/2523; A44B 11/2592; A44B 11/2511; A44B 11/263; B60R 22/00; B60R 2022/4816; Y10T 24/4567; Y10T 24/45623; Y10T 24/45644; Y10T 24/32; Y10T 24/45534; Y10T 24/45628; Y10T 24/4566; Y10T 24/45665; Y10T 24/45675; Y10T 24/45785; Y10T 24/45822
USPC ................................... 24/616, 642, 643, 671
See application file for complete search history.

(56) References Cited

U.S. PATENT DOCUMENTS

| 4,642,857 A | 2/1987 | Ono |
| 4,949,436 A | 8/1990 | Anscher |

(Continued)

FOREIGN PATENT DOCUMENTS

EP   0427525 A1   5/1991

OTHER PUBLICATIONS

International Search Report for PCT/KR2013/008619, ISA/KR, Daejeon, mailed Jan. 8, 2014.

*Primary Examiner* — Victor Batson
*Assistant Examiner* — David Upchurch
(74) *Attorney, Agent, or Firm* — Stephen T. Olson; Harness, Dickey & Pierce, P.L.C.

(57) ABSTRACT

Disclosed is a buckle apparatus for a seat belt. The buckle apparatus Includes an upper cover including a front plate formed with an opening part; a lower cover engaged with a lower portion of the upper cover and provided therein with a base frame; a latch member including one end rotatably supported on the base frame and locked with a tongue plate inserted through the opening part; an ejector assembly provided on the base frame for locking and releasing between the tongue plate and the latch member; and a release button slidably provided on both sides of the base frame and disposed in an upper portion of the opening part so that one side of the release button is exposed. At least one elastic member is integrally provided on an upper end of the front plate to elastically press a bottom surface of the tongue plate.

5 Claims, 5 Drawing Sheets

(56) References Cited

U.S. PATENT DOCUMENTS

| | | |
|---|---|---|
| 5,113,556 A | 5/1992 | Murai et al. |
| 5,357,658 A * | 10/1994 | Tanaka ............... A44B 11/2523 24/633 |
| 2004/0107550 A1 | 6/2004 | Lee et al. |
| 2007/0044283 A1 * | 3/2007 | Longley ............. A44B 11/2515 24/633 |
| 2008/0040905 A1 | 2/2008 | Webber et al. |
| 2012/0137478 A1 * | 6/2012 | Nimura ................... B60R 22/48 245/593.1 |
| 2012/0324685 A1 * | 12/2012 | Kataoka ............. A44B 11/2523 24/637 |

* cited by examiner

BUCKLE APPARATUS FOR SEAT BELT

CROSS-REFERENCE TO RELATED APPLICATIONS

This application is a 371 U.S. National Stage of International Application No. PCT/KR2013/008619, filed Sep. 26, 2013, which claims priority to Korean Patent Application No. 1020120087827, filed Aug. 10, 2012. The entire disclosures of each of the above applications are incorporated herein by reference.

TECHNICAL FIELD

The present invention relates to a buckle apparatus locking/releasing a tongue plate of a seat belt.

BACKGROUND ART

Automobiles and various types of transportation vehicles include a seat belt protecting a passenger from impact. The seat belt is provided with a buckle apparatus for locking/releasing a tongue plate of the seat belt.

The buckle apparatus includes a latch member having a claw pressed to an engagement direction by a spring and fitted with the tongue plate. The tongue plate connected to the seat belt is inserted into the buckle apparatus so that the latch member of the buckle apparatus is fitted with the tongue plate, and the latch member engages with the tongue plate by a locking bar so that the seat belt confines the passenger.

To release engagement of the latch member with the tongue plate, if a release button is pressed in the release direction, the locking bar is moved to a release location so that the tongue plate is released from a buckle.

However, the buckle apparatus has a problem in that the tongue plate moves (hereinafter referred to as 'up-down movement') in the direction approximately perpendicular to the insertion direction of the buckle when the tongue plate is inserted into the buckle apparatus.

A buckle for a seat belt according to the related art is disclosed in European Patent No. 0557983 and Korean Utility Model Registration No. 20-0416588.

DISCLOSURE OF INVENTION

Technical Problem

The present invention has been made to solve the problems occurring in the prior art, and an object of the present invention is to provide a buckle apparatus in which an elastic member for preventing a tongue plate inserted into the buckle apparatus from moving in an up-down direction is integrated with an upper cover forming an outer appearance of the buckle apparatus.

Solution to Problem

In order to accomplish the object of the present invention, there is provided a buckle apparatus for a seat belt, the buckle apparatus including an upper cover including a front plate formed with an opening part; a lower cover engaged with a lower portion of the upper cover and provided therein with a base frame; a latch member including one end rotatably supported on the base frame and locked with a tongue plate inserted through the opening part; an ejector assembly provided on the base frame for locking and releasing between the tongue plate and the latch member; and a release button slidably provided on both sides of the base frame and disposed in an upper portion of the opening part so that one side of the release button is exposed, wherein at least one elastic member is integrally provided on an upper end of the front plate to elastically press a bottom surface of the tongue plate.

According to the present invention, the elastic member may include a support part protruding from the upper end of the front plate toward an inner side of the upper cover and movable up and down; and a pressing protrusion protruding from a free end of the support part and coming into contact with the bottom surface of the tongue plate.

According to the present invention, the pressing protrusion may include a contact surface coming into contact with the bottom surface of the tongue plate; and an inclined surface inclined downward from the contact surface toward a proximal end of the support part.

According to the present invention, the front plate may be inclined toward the opening part to guide an insertion operation of the tongue plate.

According to the present invention, the opening part may be defined by transverse walls protruding from inner surfaces of both side walls of the upper cover; and longitudinal walls extending downward from each distal end of the transverse walls by a predetermined distance, and the elastic member protrudes from the upper end of the front plate located between the longitudinal walls.

Advantageous Effects of Invention

According to the present invention, the elastic member includes a support part protruding from the upper end of the front plate toward an inner side of the upper cover and movable up and down; and a pressing protrusion protruding from a free end of the support part and coming into contact with a bottom surface of the tongue plate, and is integrated with an upper cover, thereby reducing the number of components, simplifying an assembling process, and reducing a defect caused by an assembling error.

According to the present invention, a tongue plate can be easily inserted and a bottom surface of the inserted tongue plate can be elastically pressed efficiently by the pressing protrusion including a contact surface coming into contact with the bottom surface of the tongue plate and an inclined surface inclined downward from the contact surface toward a proximal end of the support part.

According to the present invention, the front plate can be inclined toward the opening part to guide an insertion operation of the tongue plate, thereby facilitating an insertion operation of the tongue plate.

According to the present invention, the opening part may include transverse walls protruding from inner surfaces of both side walls of the upper cover; and longitudinal walls extending downward from each distal end of the transverse walls by a predetermined distance, thereby stably supporting the release button and guiding the insertion operation of the tongue plate.

BEST MODE FOR CARRYING OUT THE INVENTION

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention.

In drawings, reference characters "F", "R", "U" and "L" refer to front, rear, upper and lower directions, respectively.

Figure 1:
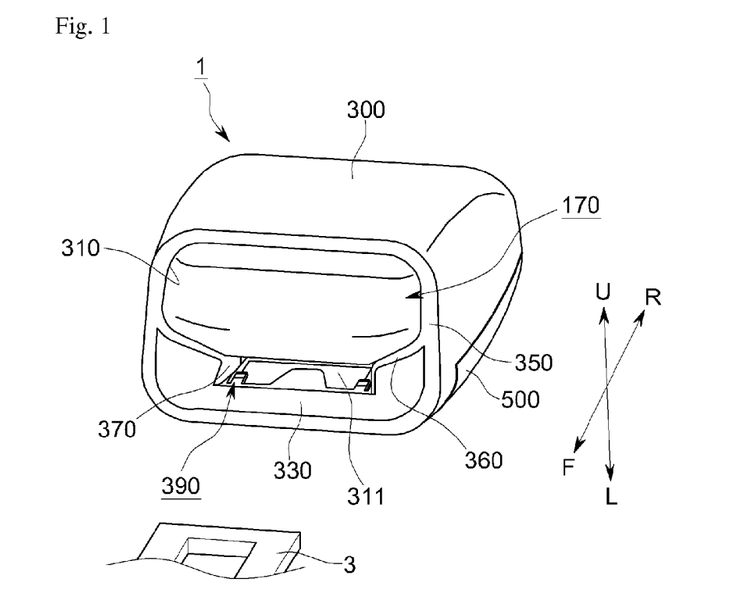
FIG. 1 is a perspective view showing a configuration of a buckle apparatus for a seat belt according to an embodiment of the present invention.

FIG. 1 is a perspective view showing a configuration of a buckle apparatus for a seat belt according to an embodiment of the present invention.

As shown in FIG. 1, a buckle 1 includes an upper cover 300 and a lower cover 500, in which a buckle assembly 100 is accommodated inside the upper cover 300 and the lower cover 500.

The upper cover 300 includes a front plate 330 formed with an opening part 310.

A release button 170 is disposed in an upper portion of the opening part 310, and a tongue plate 3 is inserted through a tongue plate insertion part 311 of the opening part 310 formed below the release button 170.

Transverse walls 360 supporting the release button 170 protrude from an inner surface of both side walls 350 of the upper cover 30, and longitudinal walls 370 extend from the transverse walls 360 in the lower direction L by a predetermined distance H to guide insertion of the tongue plate 3.

The front plate 330 is inclined toward the opening part 310 so that the tongue plate 3 is easily inserted.

At least one elastic member 390 elastically pressing a bottom surface of the tongue plate 3 is provided in an upper end 331 of the front plate 330 between the longitudinal walls 370, and prevents the inserted tongue plate 3 in a lower portion of the release button 170 from moving upper and lower directions (U and L).

Figure 2:
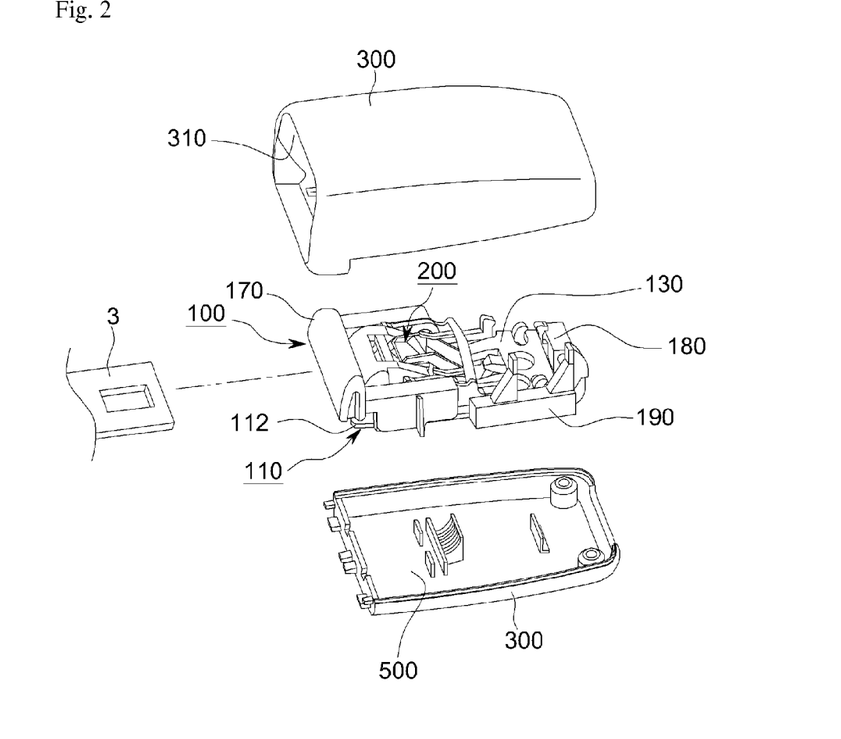
FIG. 2 is a partial exploded perspective view illustrating the buckle apparatus for a seat belt according to the embodiment of the present invention.

FIG. 2 is a partial exploded perspective view illustrating the buckle apparatus for a seat belt according to the embodiment of the present invention.

As shown in FIG. 2, a buckle assembly 100 is mounted inside the upper cover 300 and the lower cover 500, and includes a base frame 110, a latch member 130 including one end rotatably supported in both sides of the base frame 110 and inserted into the tongue plate 3, an ejector assembly 200 locking/releasing the latch member 130, and a release button 170 releasing the locking of the tongue plate 3.

A frame opening part 510 is formed in a front end of the lower cover 500 and a protrusion 112 formed in a front end of the base frame 110 extends by passing through the frame opening part 510.

In addition, the buckle assembly 100 includes a hall switch 180, which detects whether the occupant wears the safety belt by sensing the locking and releasing of the tongue plate 3 and an alarm switch 190.

Hereinafter, each element of the present invention will be described in detail.

Figure 3:
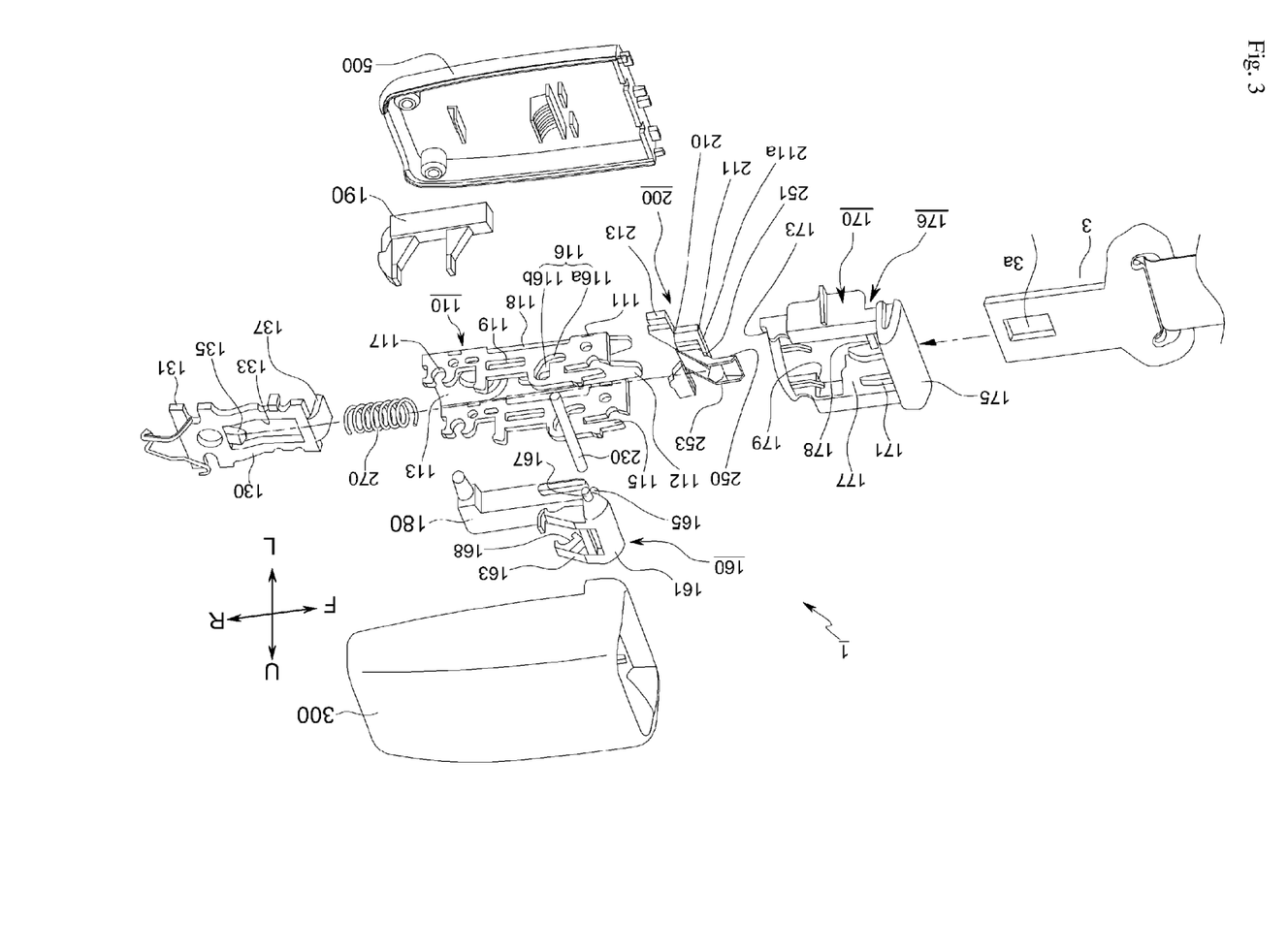
FIG. 3 is an exploded perspective view illustrating the buckle apparatus for a seat belt according to the embodiment of the present invention.

FIG. 3 is an exploded perspective view illustrating the buckle apparatus for a seat belt according to the embodiment of the present invention.

As shown in FIG. 3, a base frame 110 is a fundamental element, in which a release button 170, a latch member 130, an ejector assembly 200, a hall switch 180, and an alarm switch 190 are mounted.

The base frame 110 includes both side walls 111 and a bottom plate 113, and has a substantially U-shape. A pair of button guide holes 115 is formed at front ends of the both side walls 113 and a guide rib 171 of the release button 170 is inserted into the button guide holes 115 to slidably move therein. A pair of hinge holes 117 is formed in a rear end of the both side walls 111 so that a hinge protrusion 131 of the latch member 130 is rotatably inserted in the hinge holes 117. A pair of ejector slots 118 is formed in the center of a lower end of the both side walls 111 in the front and rear directions F and R so that the ejector 21 is inserted into the ejector slots 118.

A pair of button slots 119 is formed in an upper side of the ejector slots 118 so that a protrusion 173 formed at a rear end of the release button 170 is inserted into the button slots 119. A moving slot 116 is formed between the button guide hole 115 and the button slot 119 and a locking bar 230 of the ejector assembly 200 is inserted into the moving slot 116 to move along the moving slot 116.

The moving slot 116 includes a first groove 116a formed in the front and rear directions F and R to form a locking position of the latch member 130 and a second groove 116b formed in the upper direction (U) from the first groove 116a to form a release position of the latch member 130.

The release button 170 is mounted in front of a base frame 110 to move in the front and rear directions F and R along the button guide hole 115 and the button slot 119. The release button 170 is pressed when a belt wearer unlocks the tongue plate 3 to release the locking state between the tongue plate 3 and the latch member 130. A tongue plate insertion part 176 is formed at a lower portion of the release button 175 so that the tongue plate 3 can be inserted between a lower portion of a pressing part 175 of the release button 170 and a bottom plate 113 of the base frame 110.

The guide rib 171 inserted into a button guide hole 115 protrudes from inner surfaces of the both side walls 177 of the release button 170. A hinge groove 178 is concavely formed in an inner bottom of the release button 170 so that a hinge pin 191 of an inertial lever 160 is loosely inserted into the hinge groove 178. A pressing groove 179 is concavely formed in a rear end of the guide rib 177 so that both ends of a locking bar 230 are inserted into the pressing groove 179.

The ejector assembly 200 is used for allowing the latch member 130 to engage with or to be separated from the tongue plate 3, and includes an ejector 210, the locking bar 230, a hook lever 250, and a spring 270.

A spring seat 133 is formed at the center portion of the latch member 130 through the cutting process so that a spring 270 can be positioned in the spring seat 133. A fitting protrusion 135, around which the spring 270 is fitted, is provided in a rear end of the spring seat 130. A claw 137 inserted in a locking groove 3a of the tongue plate 3 protrudes at a front end of the latch member 130.

The ejector 210 includes an ejector body 211 having a contact end 211a straightly formed in a width direction perpendicular to the front and rear directions F and R of the base frame 110 to make contact with an end of the tongue plate 3, and a sliding protrusion 213 protruding from both sides of the ejector body 211 to be fitted into the ejector slot 118.

An end of the hook lever 250 is rotatably supported on the center portion of the ejector body 211. The claw 251 locked with an outer peripheral surface of the locking bar 230 protrudes from a bottom surface of the hook lever 250. A spring protrusion 253 fitted with the other end of the spring 270 protrudes from a top surface of the hook lever 250. The spring 270 elastically supports the hook lever 250 such that the hook lever 250 always presses the locking bar 230.

The buckle 1 is provided with an inertial lever 160 which is prepared inside the release button 170 to prevent the ejector assembly 200 from being released due to inertial force generated during an operation of a pre-tensioner. The inertial lever 160 includes hinge pins 165 which are prepared at a front end of the inertial lever 160 and are inserted into a hinge groove 178 of the release button 170, and guide pins 167 confined in an inner side of the release button 170 in both sides of the hinge pins 165 so that the inertial lever 160 may not deviate in the longitudinal direction. A locking groove 168 inserted into an outer surface of the locking bar 230 is formed in a rear end of the inertial lever 160.

The buckle assembly 100 as described above is disclosed in European Patent No. 0557983 and Korean utility model registration No. 20-0416588, so detailed description about the operation thereof will be omitted.

The buckle assembly 1 is not limited to the foregoing structure. A configuration for locking or releasing the tongue plate 3 with or from the latch member 130 may be variously modified.

Figure 4:
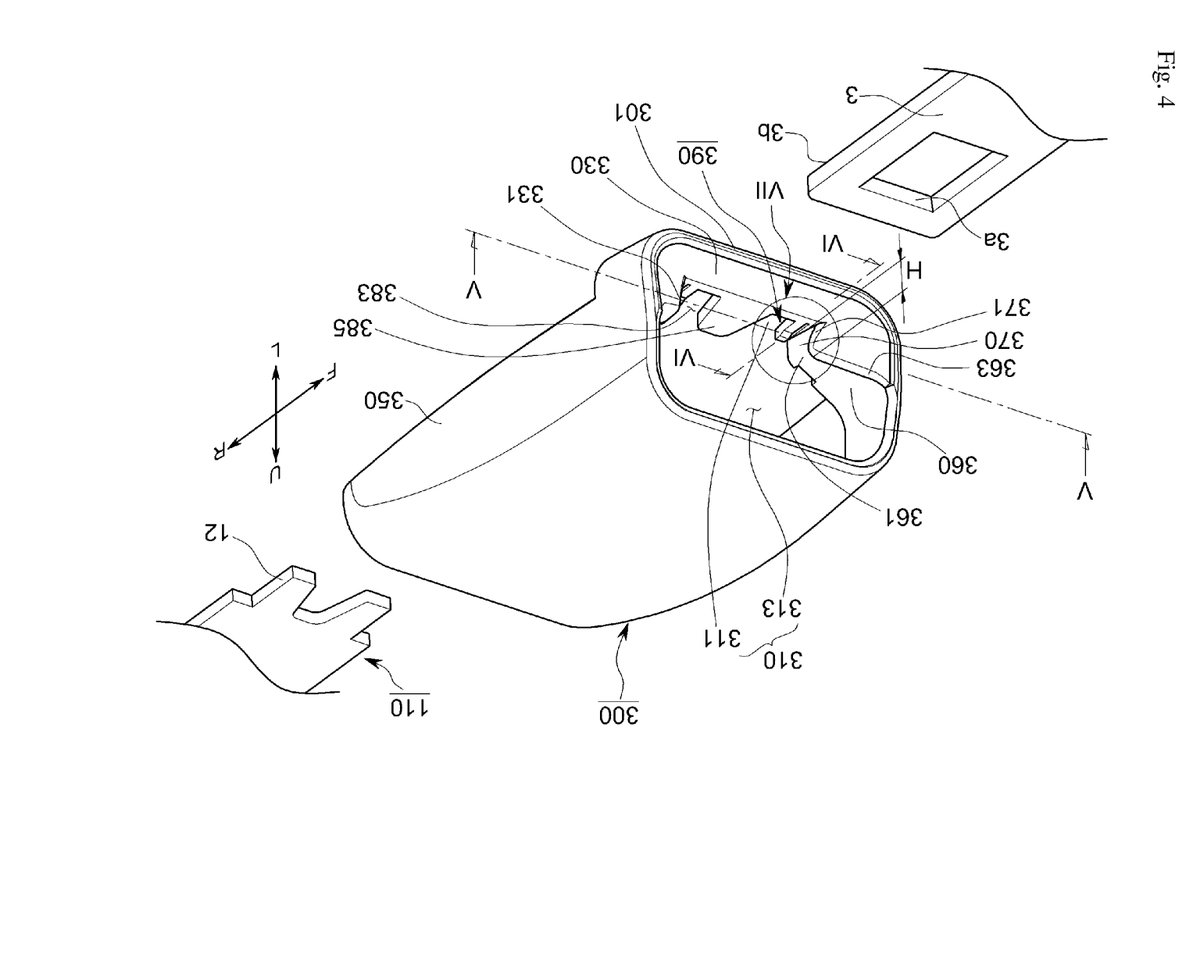
FIG. 4 is a perspective view illustrating a configuration of an upper cover of the buckle apparatus for a seat belt according to the embodiment of the present invention.
Figure 5:
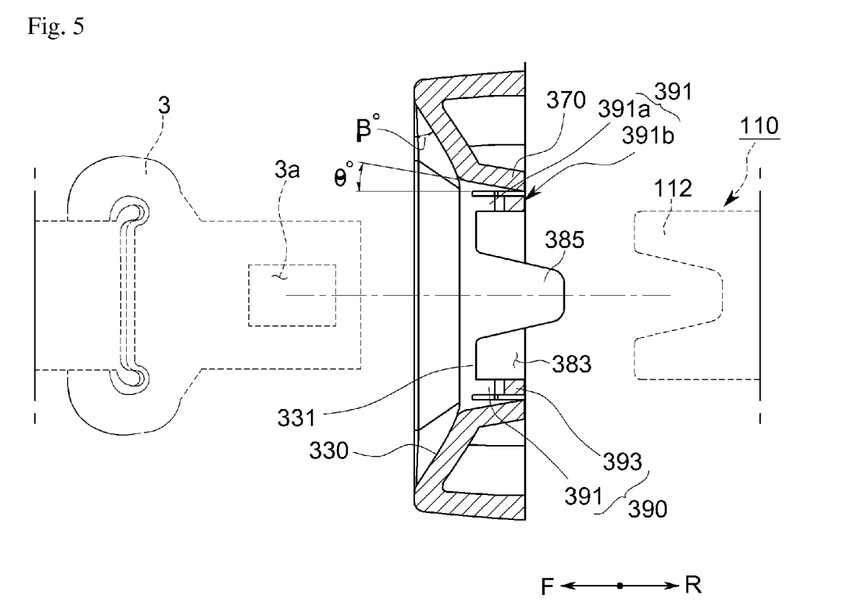
FIG. 5 is a cross sectional view taken along line V-V of FIG. 4.

FIG. 4 is a perspective view illustrating a configuration of an upper cover of the buckle apparatus for a seat belt according to the embodiment of the present invention, and FIG. 5 is a cross sectional view taken along line V-V of FIG. 4.

Referring to FIGS. 4 and 5, the upper cover 300 includes a front plate 300 having an opening part 310.

The opening part 310 includes a button insertion part 313 prepared at an upper portion of the opening part 310 and in which a pressing part 175 of FIG. 3 is located and a tongue plate insertion part 311 prepared at a lower portion of the opening part 310 and in which the tongue plate is inserted.

A pair of transverse walls 360 protrudes from inner surfaces of both side walls 350 of the upper cover 300 so that a button insertion part 313 is formed. The transverse walls 360 movably support a lower end of the release button 170 in the front and rear directions F and R.

A longitudinal wall 370 extends downward in a distal end 361 of the transverse wall 360 by a predetermined length H so that a tongue plate insertion part 311 into which the tongue plate 3 is inserted is formed. The longitudinal wall 370 is a wall for guiding insertion of the tongue plate 3, and is inclined toward a center axis of the upper cover 10 at a first predetermined angle θ°.

A front end of the transverse wall 360 is inclined toward an inside of the upper cover 300 at a second predetermined angle β°. As a result, the front plate 330 is inclined toward the opening part 310 so that the tongue plate 3 is easily inserted. That is, the front plate 330 covers between a front end 363 of the transverse wall 360 and a front end 301 of a lower side of the lower cover 300 and between a front end 371 of the longitudinal wall 370 and the front end 301 of the lower side of the lower cover 300.

At least one elastic member 390 is integrally provided on the upper end 331 of the front plate 330 located between the longitudinal walls 370, and elastically presses the bottom surface 3b of the tongue plate 3 inserted through the tongue plate insertion part 311 to prevent the tongue plate 3 from moving upper and lower directions U and L in a lower portion of the release button 170.

A protrusion 385 is additionally formed such that a concave part 383 is formed in a center portion of an upper end 331 of the front plate 330 and into which a frame cover protrusion 112 formed in a front end of the base frame 110 is inserted. A cover protrusion 380 and a frame protrusion 112 are fitted with each other such that upper surfaces thereof can be aligned in the same plane to prevent the interference with the tongue plate 3 upon the insertion and separation operations of the tongue plate 3.

According to an embodiment of the present invention, the opening part 310 is partitioned by the transverse walls 360 and the longitudinal walls 370 and includes a tongue plate insertion part 311 and a release button insertion part 313.

Alternatively, the transverse walls 360 and the longitudinal walls 370 may be omitted. In this case, a panel (not shown) covering the opening part 310 is prepared in a front end of the release button 170, and a lower portion of the panel is cut such that the tongue plate 3 can be inserted into the panel.

Figure 6:
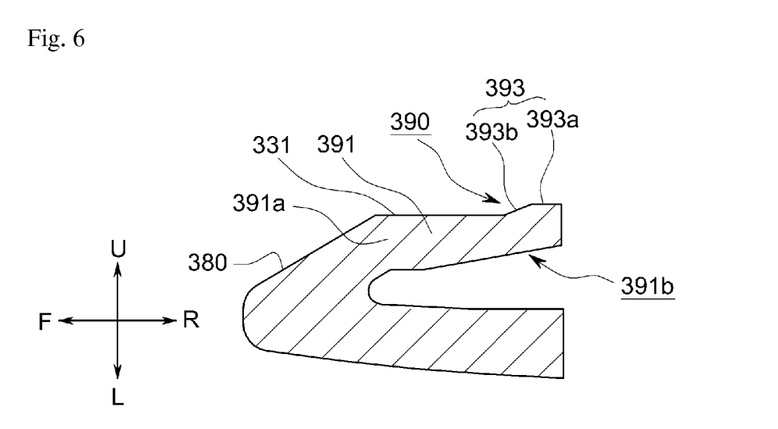
FIG. 6 is a longitudinal sectional view taken along line VI-VI of FIG. 4.
Figure 7:
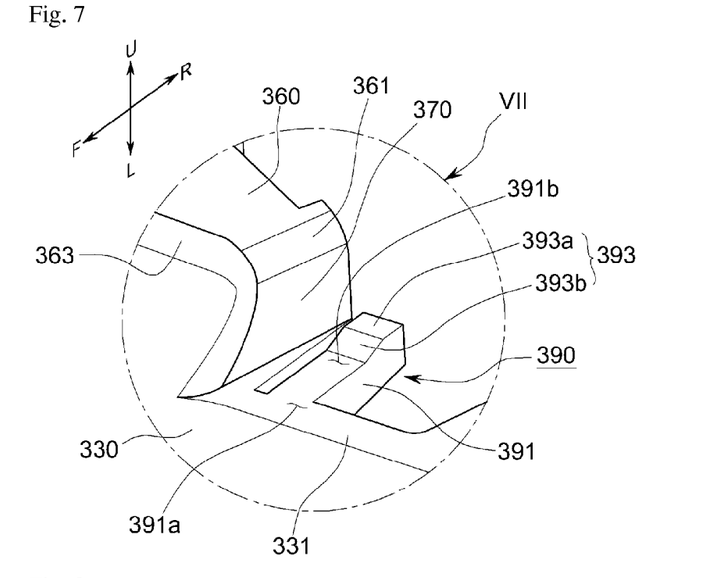
FIG. 7 is an enlarged view of a VII portion shown in FIG. 4.

FIG. 6 is a longitudinal section view taken along line VI-VI of FIG. 4, and FIG. 7 is an enlarged view showing a portion VII of FIG. 4.

Referring to FIGS. 6 and 7, an elastic member 390 protrudes from an upper end 331 of the front plate 330 in the rear direction (R). The elastic member 390 includes a support part 391 including one side 391 supported to be moved in upper and lower directions and a pressing protrusion 393 is provided in a top surface of a free end 391 of the support part 391 to support a bottom surface of the tongue plate 3.

The pressing protrusion 393 includes a contact surface making contact with a bottom surface of the tongue plate 3 and an inclined surface 393b inclined downward toward a proximal end 391a of the support part 391 from the contact surface 393a. Accordingly, the pressing protrusion 393 allows the tongue plate 3 to be easily inserted, and elastically presses a bottom surface of the tongue plate 3 to prevent the tongue plate 3 from moving up and down.

That is, when the tongue plate 3 is inserted through the tongue plate insertion part 311 disposed at a lower portion of the release button 170, a front end 3a of the tongue plate 3 is slid along the inclined surface 393b of the pressing protrusion 393 so that the tongue plate 3 is smoothly inserted without interfering with the pressing protrusion 393.

When the insertion is completed, the bottom surface of the tongue plate 3 comes into contact with the contact surface 393a of the pressing protrusion 393 and is pressed upward, so that the up-down movement of the tongue plate 3 is restricted.

The elastic member 390 may be disposed adjacent to the longitudinal wall 370.

Figure 8:
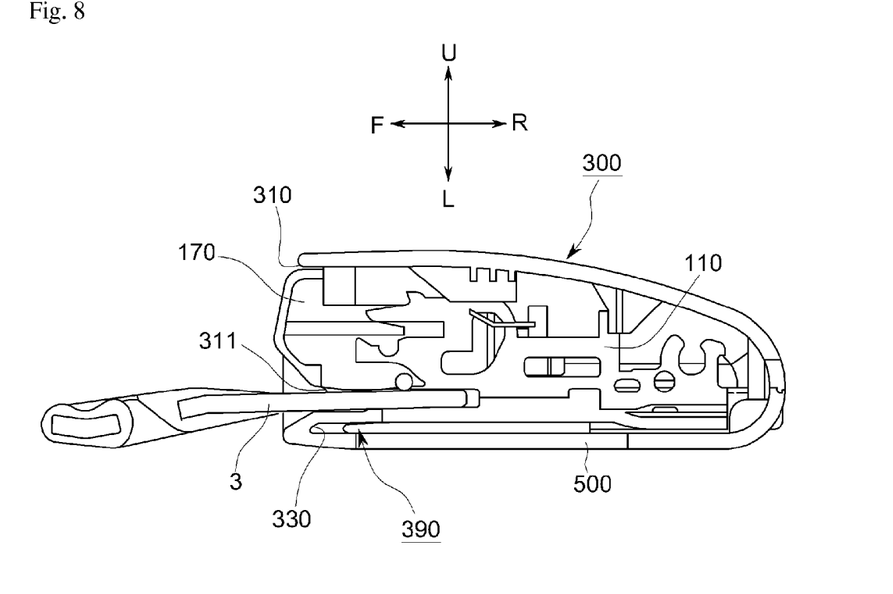
FIG. 8 is a side view showing a configuration of a buckle apparatus to which an upper cover is applied according to one embodiment of the present invention, in which only structures of a tongue plate, an upper cover plate, a lower cover plate, a release button, and a frame are schematically illustrated.

FIG. 8 is a side view showing a configuration of a buckle apparatus to which an upper cover is applied, in which only structures of a tongue plate, an upper cover plate, a lower cover plate, a release button, and a frame are schematically illustrated.

Referring to FIG. 8, the tongue plate 3 is introduced through the tongue plate insertion part 311 of the opening part 310 and is located between a lower portion of the release button 170 and the base frame 110. In this case, the bottom surface of the tongue plate 3 is pressed by the pressing protrusion 393 of the elastic member 390 integrally formed on a lower portion of the upper cover 300, thereby preventing the tongue plate 3 from moving in the upper and lower directions (U and L).

As described above, the elastic member 390 may be integrally provided on the upper cover 300 forming an outer appearance, so that the number of components can be reduced and the assembling process can be simplified. Further, the defect due to an assembling error may be reduced, so that the up-down movement of the tongue plate 3 can be effectively prevented.

Although it has been described that the elastic member 390 is integrally provided with the upper cover 300 in a structure where the release button 170 is pressed in a front end of the upper cover 300 of the buckle apparatus 1, the present invention is also applicable to a buckle apparatus for releasing the locking of the tongue plate by pressing the release button downward from the upper end of the upper cover.

Although the exemplary embodiments of the present invention have been described, it is understood that the exemplary embodiments help one ordinary skilled in the art to easily realize the present invention should not be limited to these exemplary embodiments and accompanying drawings. Therefore, various changes and modifications can be apparently made by the skilled in the art without departing from the technical sprit of the present invention. In addition, it is understood that parts that can be easily changed by the skilled in the art are within the spirit and scope of the present invention as hereinafter claimed.

The invention claimed is:

1. A buckle apparatus for a seat belt, the buckle apparatus comprising:
    an upper cover including a front plate formed with an opening part;
    a lower cover engaged with a lower portion of the upper cover and provided therein with a base frame;
    a latch member including one end rotatably supported on the base frame and locked with a tongue plate inserted through the opening part;
    an ejector assembly provided on the base frame for locking and releasing between the tongue plate and the latch member; and
    a release button slidably provided on both sides of the base frame and disposed in an upper portion of the opening part so that one side of the release button is exposed,
    wherein at least one elastic member is integrally provided on an upper end of the front plate to elastically press a bottom surface of the tongue plate.

2. The buckle apparatus of claim 1, wherein the elastic member comprises:
    a support part protruding from the upper end of the front plate toward an inner side of the upper cover, and the support part being movable up and down; and
    a pressing protrusion protruding from a free end of the support part and coming into contact with the bottom surface of the tongue plate.

3. The buckle apparatus of claim 2, wherein the pressing protrusion comprises:
    a contact surface coming into contact with the bottom surface of the tongue plate; and
    an inclined surface inclined downward from the contact surface toward a proximal end of the support part.

4. The buckle apparatus of claim 2, wherein the front plate is inclined toward the opening part to guide an insertion operation of the tongue plate.

5. The buckle apparatus of claim 1, wherein the opening part is defined by transverse walls protruding from inner surfaces of both side walls of the upper cover; and longitudinal walls extending downward from each distal end of the transverse walls by a predetermined distance, and
    the elastic member protrudes from the upper end of the front plate located between the longitudinal walls.

\* \* \* \* \*